United States Patent [19]

Luvinh et al.

[11] Patent Number: 4,636,555

[45] Date of Patent: Jan. 13, 1987

[54] PETROLEUM RESINS AND THEIR PRODUCTION

[75] Inventors: Quoc Luvinh, Brussels; Jacques Lechat, Overijse, both of Belgium; Morris L. Evans, Baton Rouge, La.; Andre Lepert, Allouville Bellefosse, France

[73] Assignee: Exxon Research & Engineering Co., Florham Park, N.J.

[21] Appl. No.: 778,600

[22] Filed: Sep. 20, 1985

[30] Foreign Application Priority Data

Sep. 21, 1984 [GB] United Kingdom ................. 8423919

[51] Int. Cl.$^4$ ............................................... C08F 4/14
[52] U.S. Cl. .................................... 526/290; 526/340; 526/347
[58] Field of Search ......................... 526/290, 340, 347

[56] References Cited

U.S. PATENT DOCUMENTS

| | | | |
|---|---|---|---|
| 4,048,424 | 9/1977 | Ishikawa | 526/290 |
| 4,230,836 | 10/1980 | Canterino | 526/340 |
| 4,245,075 | 1/1981 | Lepert | 526/290 |
| 4,347,344 | 8/1982 | Ong | 526/347 |

FOREIGN PATENT DOCUMENT 1493426  11/1977  United Kingdom .

*Primary Examiner*—Paul R. Michl
*Attorney, Agent, or Firm*—J. F. Hunt

[57] ABSTRACT

Resins having an improved combination of softening point and tackifying properties together with good color and heat stability are obtained by Freidel-Crafts copolymerization of a $C_5/C_6$ unsaturated feed and 5 to 30 wt. % of para methyl styrene.

5 Claims, No Drawings

PETROLEUM RESINS AND THEIR PRODUCTION

The present invention relates to new improved petroleum resins and their production. In particular the invention relates to resins suitable as tackifiers for adhesive formulations particularly hot melt adhesives, hot melt pressure sensitive adhesives and solvent based pressure sensitive adhesives.

Petroleum resins obtained by polymerisation of $C_5$ dienes such as pentadiene 1,3 and/or isoprene are well known as is their use as components in hot melt formulations, however there is a need to improve the adhesive properties of such hot melts particularly when applied to substrates traditionally difficult to adhere to such as glass and polyethylene.

Previous techniques have been proposed to improve the adhesive properties of resins by controlling molecular weight during polymerisation such as adding branched olefines, alkyl aromatics and alkyl halides to the polymerisation, see for example United Kingdom Pat. Nos. 1538057 and 1537852.

One disadvantage of these earlier techniques is that the presence of the molecular weight controlling additive tends to reduce the softening point of the resin thus rendering it unsuitable for certain adhesives. In addition they tend to impair the compatibility of the resin with the ethylene/vinyl acetate copolymer and wax normally present in hot melt adhesive systems.

It has been proposed in Japanese Patent Application No. 7430489 to include α-pinene for copolymerisation with petroleum resin feeds and French Pat. No. 2368504 suggests the inclusion of vinyl-norbornene or tetrahydroindene. It has also been proposed in European Pat. No. 0013393 that limonene may be copolymerised with $C_5$ olefine and diolefin feeds and European Patent No. 0013060 proposes that carene may be copolymerised with $C_5$ olefine and diolefine feeds. These patents also make passing reference to the fact that unsaturated aromatics such as styrene or para-methyl styrene may be included.

It has also been proposed that $C_5/C_6$ unsaturated feeds may be copolymerised with olefinically unsaturated corrective compounds such as styrene, vinyl toluene, indene and methyl styrene. Whilst this can result in combined adhesive properties it results in an undesirable lowering of softening point.

In order for a resin to be useful as a tackifier in adhesive systems it is necessary that is has the required softening point consistent with the necessary adhesive properties and also good compatibility with the other components of the adhesive system.

The other component depends upon the use to which the adhesive is to be put but for hot melt adhesives with which the present invention is particularly concerned the other component is frequently an ethylene/vinyl acetate copolymer.

We have now found that a particularly desirable combination of properties may be achieved by the copolymerisation of a certain amount of a $C_5$ olefine and/or diolefine and/or $C_6$ olefine and/or diolefine feed, and a certain amount of para methyl styrene and that these copolymers have a significantly higher softening point than similar resins containing styrene or alpha methyl styrene.

The present invention provides a process for the production of petroleum resins comprising copolymerising using a Friedel Crafts catalyst a mixture of:

(i) 70 to 95 wt. % of a feed comprising $C_5$ olefines and/or diolefines, and/or $C_6$ olefines and/or diolefines or a mixture of $C_5$ and $C_6$ olefines and/or diolefines and
(ii) 5 to 30 wt. % of para methyl styrene.

The $C_5$ and/or $C_6$ diolefine and/or olefine containing feed used in our process may be obtained from the cracking of petroleum feedstock: These feedstocks usually boil in a range from 20° C. to 55° C. Such feedstocks include naphthas, kerosene, gas oil and vacuum gas oil.

The petroleum feedstock is cracked, preferably in the presence of steam, and the recommended cracking temperature is between 500° C. and 870° C. The product which contains unsaturated hydrocarbons usually boiling in the range of 20° C. to 240° C., preferably 20° C. to 130° C., generally is thereafter subjected to fractionation to remove $C_2$ to $C_4$ light ends. If the feedstock contains large amounts of cyclopentadiene it should be subjected to thermal soaking at a temperature between 100° C. and 160° C., preferably 120° C. to 140° C., e.g. at about 130° C. The thermal soaking preferably takes 0.5 to 6 hours, e.g. 0.5 to 3 hours to reduce the level of cyclopentadiene or dicyclopentadiene to below 2 wt. %. Low temperature heat soaking is preferred in order to limit the cyclodiene (Cylopentadiene and Methylcyclopentadiene) co-dimerisation with $C_5$ linear conjugated dienes (isoprene and pentadienes 1,3 cis- and trans-). After fractionation and, if carried out, thermal soaking, the feedstock is preferably subjected to distillation to remove cyclic conjugated diolefines.

After distillation one obtains an overhead naphtha which usually boils in the range from 15° to 110° C., e.g. 25° to 80° C., the best results being achieved with a 25°–70° C. cut. This overhead naphtha comprises mainly $C_5$ diolefines such as isoprene and 1,3 cis- and trans-pentadienes (piperylene) $C_5$ to $C_6$ monoolefines and aromatics for example benzene. In general the overhead naphthas have the following compositions:

|  | % by weight |
|---|---|
| Total paraffins | 1.0 to 41.5 |
| Total diolefines | 50.0 to 14.5 |
| Total olefines | 33.5 to 13.0 |
| Total aromatics | 20.0 to 35.0 |
| Isoprene | 16.5 to 6.5 |
| Pentadiene 1,3 | 15.5 to 4.5 |

The exact composition depending on the nature of the petroleum feedstock which is subjected to steam cracking. Cyclopentene contents are generally below 3.0 wt. %. These feeds contain materials such as paraffins and aromatics which are not polymerised during the process of the invention and it is emphasised that these materials are not considered to be part of the reaction mixture for the purposes of this invention.

The feed could be significantly isoprene free provided this compound is previously recovered through any conventional separation process such as distillation, extractive distillation, or azeotropic distillation. In this case the feed may be a narrow fraction pentadiene 1,3 concentrate. A typical such composition contains less than 5% wt. isoprene, from 25 to 80 wt. % pentadiene 1,3 (cis and trans isomer). Other $C_5$ and/or $C_6$ olefines, and/or diolefines and paraffins making up the remainders. Moreover, depending on the final boiling point of the feed cut the feedstock could be substantially free of benzene.

We have found that using the para methyl styrene in the proportions proposed leads to significantly improved resin properties. When unsaturated aromatics such as styrene are copolymerised with $C_5$ feeds the result is an undesirable lowering of the softening point of the resin even although an improvement in adhesive properties is achieved. We have found however that if para methyl styrene is used the improvement in the adhesive properties may be retained without the dramatic reduction in softening point. Such improved adhesion has been found to enable the tackification of hitherto difficult to tackify rubbers such as the commercially available product Cariflex (Registered Trade Mark) 1011 and to result in improved adhesive properties in hot melt adhesives containing ethylene vinyl acetate copolymers and wax on substrates such as glass and aluminium together with improved compatibility with the other components of the hot melt adhesive system.

In addition the resins of the present invention have been found to have low colour and good heat stability. Further the process has a high yield, above 40 wt. % and sometimes as high as 75 wt. % or higher.

Agents to narrow the molecular weight distribution may be employed in the present invention for example as the branched chain reactive aliphatic olefines of our United Kingdom Pat. No. 1538057 may be used to achieve narrow distribution. The ratios of the amount of feed to the amount of branched olefine used may be varied to obtain resins of any desired softening point within the range 60° C. to 140° C. Where branched olefines are used a broad e.g. $C_5$–$C_8$ fraction may be used. The preferred branched chain reactive aliphatic olefins are oligomers of propylene and butylenes obtained with phosphoric acid catalysts or from a Fluid Catalytic Cracker.

Other chain transfer agents such as the alkyl halides of our UK Pat. No. 1537852 may also be used optionally as part of the catalyst system.

The feeds are mixed and polymerized using a Friedel Crafts catalyst, for example aluminium chloride, aluminium bromide or an aluminium chloride/hydrochloric acid/aromatic or aluminium chloride/alkyl halide/aromatic hydrocarbon complex, the aromatic hydrocarbon being preferably alkyl saturated for example O-xylene, mesitylene, ethyl benzene, isopropyl benzene and other short or long chain alkyl benzenes being especially suitable. The alkyl chain can be linear or branched and can vary from 1 to 30 carbon atoms.

Acid liquid $ALCl_3$ sludges obtained as by-products during alkylation of benzene or any other substituted aromatics (e.g. toluene or xylenes) with branched chain olefines can be directly used as catalyst for the above described polymerisation process. As an example the acidic sludge available from a dodecylbenzene plant provided similar results to the preformed O-xylene $ALCL_3$/HCL liquid complex sludges from other substituted branched or straight chain aromatic production. For example, meta and/or para diisopropyl benzenes and para-tertiary butyl benzene may also be used.

These liquid complexes are slightly more efficient than $ALCL_3$ powder at equivalent concentration and provide slightly higher resin yields and lower resin molecular weight.

In the polymerisation process the amount of catalyst may vary from 0.25 to 3.0 wt.% preferably 0.5 to 1.5 wt.% based on the weight of the mixture to be polymerized. The optimum concentration depends on the nature of the solvent which affects the solubility of the catalyst as well as on the stirring efficiency inside the polymerization reactor.

Other Friedel Crafts catalysts like titanium tri- or tetrachloride, tin tetrachloride, boron trifluoride, boron trifluoride complexes with organic ethers, phenols or acids can also be used but they lead to rather low resin yields and large quantities of liquid oligomers of low value are obtained. Even though these oily oligomers can be upgraded as reactive plasticizer or liquid plasticizer such catalysts are not recommended. Other possible catalysts can be acidic clays.

Usual polymerisation temperatures are between −20° C. and 100° C., preferably between 30° and 80° C., we find that if lower temperatures are used the resin colour is improved although there can be a reduction in yield.

After polymerization the residual catalyst may be removed by for example washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins-/unreactive olefins) and low molecular weight oil oligomers by steam stripping or vacuum distillation. The finished resin has a softening point of from 60° C. to 120° C., preferably 70° to 110° C.

The process of the present invention results in a mixture of the desired resin and unsaturated material known as fill which can amount to as much as 25% of the production. The conversion of the various components to useful resin varies and hence the composition of the resin obtained may not correspond to the proportions of the components present in the polymerisation reaction. For example whilst the conversion of the alkyl aromatic feed may be virtually complete whilst that of the $C_5$/$C_6$ feed may be lower. We have found however that, providing the proportions specified are polymerized according to the process of the present invention, resins have the improvement in properties described are obtained. The resins obtained generally contain from 5 wt.% to 60 wt.% of units derived from para methyl styrene and from 40 wt.% to 95 wt.% of units derived from the $C_5$ olefine and/or diolefine and/or $C_6$ and/or diolefine or mixtures of $C_5$ and $C_6$ olefines and/or diolefines.

The present invention therefore provides a resin comprising a copolymer containing from 5 wt.% to 60 wt.% of units derived from para methyl styrene and from 40 wt.% to 95 wt.% of units derived from $C_5$ olefines and/or diolefines and/or $C_6$ olefines and/or diolefines or a mixture of $C_5$ and $C_6$ olefines and/or diolefines.

The amount of para methyl styrene present may readily be determined by proton NMR.

For optimum use in hot melt adhesive formulations we prefer that the resins have a softening point in the range 75° C. to 115° C. preferably 90° C.–105° C. and have a molecular weight of from 500 to 1500 as measured by GPC.

The resins obtained can be used in many applications which require low viscosity, good flexibility and elongation before or especially after chemical modification with polar compounds such as phenols, unsaturated anhydrides such as maleic anhydride or unsaturated acids (e.g. fumaric adic). These resins are designed for a wide range of end uses and applications. They can be applied to paper, metal, thermo-plastic films, Cellophane (Registered Trade Mark), polyester, PVC, woven or non woven fabrics, glass etc. and for bonding such materials together. Typical applications are hot melts, carpet backing, coating with drying oil formulations, book binding, paper sizing or in any applications involving natural or synthetic and/or rubbers such as caulks, sealants or rubber tackification.

More especially they may be used as tackifiers with natural rubber or synthetic rubbers such as polyisoprene, EPDM, butyl, chlorobutyl, bromobutyl, neoprene and block copolymers for example styrene/isoprene rubber (Shell Cariflex (Registered Trade Mark) TR1107) and mixtures of such rubbers.

Other applications involving such resin properties are pressure sensitive adhesives, hot melt adhesives, hot melt pressure sensitive adhesives, low temperature adhesives, label adhesives, latex adhesives, surgical tapes and masking tapes where they may be blended with polymers such as ethylene/vinyl acetate copolymers and optionally with wax.

The present invention therefore further provides the use as a component in an adhesive formulation of a resin which is a copolymer containing from 5 wt.% to 60 wt.% of units derived from para methyl styrene and from 95 wt.% to 40 wt.% of units derived from $C_5$ olefines and/or diolefines and/or $C_6$ olefines and/or diolefines or a mixture of $C_5$ and $C_6$ olefines and/or diolefines.

In particular the present invention provides a hot melt adhesive comprising (i) an ethylene vinyl acetate copolymer
(ii) wax and
(iii) a resin which is a copolymer containing from 5 wt.% to 60 wt.% of units derived from para methyl styrene and from 40 wt.% to 95 wt.% of units derived from $C_5$ olefines and/or diolefines and/or $C_6$ olefines and/or diolefines or a mixture of $C_5$ and $C_6$ olefines and/or diolefines.

The present invention is illustrated but in no way limited by reference to the following examples. In which the following feeds were used:

| Piperylene Concentrate Initial Boiling Point to 70° C. | |
|---|---|
| Isoprene | 1.17 |
| Pentene-2 trans. | 1.6 |
| Pentene-2 cis. | 3.45 |
| 2 Me-butene-2 | 3.59 |
| Pentadiene 1,3 trans. | 43.36 |
| Pentadiene 1,3 cis. | 23.55 |
| 1,2 dimethylbutane | 0.38 |
| Cyclopentene | 14.99 |
| 4 methylpentene-1 3 methylpentene-1 | 0.56 |
| 3 methylpentadiene 1,4 4 methylpentadiene-2 cis. 2,3 dimethylbutene-1 | 0.17 |
| Cyclopentane | 1.58 |
| 4 methylpentene 2t | 0.06 |
| 2 methylpentene | 0.22 |
| 2 methylpentene-1 | 0.01 |
| 3 methylpentene | 0.03 |

A fluid catalytic cracking $C_5/C_6$ olefine concentrate containing 45 wt.% olefines and 55 wt.% saturates. The concentrates described above were mixed with pure para methyl styrene and a paraffinic or aromatic solvent in the proportions set out in Table 1. For the sake of comparison pure styrene and pure alpha methyl styrene were used in similar polymerisations and these results are also set out in Table 1. The mixtures were polymerised at 45° C. using 1 wt.% $AlCl_3$ as catalyst. The polymerisation conditions used were as follows:

The reaction mixture (as described in Table 1) was fed to a 2 liters glass reactor which was fitted with a mechanical stirrer, a cooler and a catalyst injection device. 1 wt.% of powdered $AlCl_3$ as catalyst based on the total weight of the feed was injected into the reactor which was then held at 40° C.–50° C. for 90 minutes. An ammonia solution was added to stop the reaction after the desired reaction time. The resin was then obtained after a steam-stripped process at 250° C. under nitrogen atmosphere.

The solvent used contains:
paraffins >97 wt.%
aromatics 0.5 wt.%
diolefins, olefins: balance The properties of the resins obtained and their adhesive properties are also set out in Table 1.

TABLE 1

| Experiment | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Feed Composition (wt %) | | | | | | | | | | | | | | | | | | |
| Piperylene concentrate | 29 | 29 | 31 | 32.3 | 32.3 | 34.1 | 35.9 | 37.3 | 39.8 | 36.8 | 33.4 | 35.4 | 37.3 | 30.3 | 31.7 | 35 | 30.3 | 30.3 |
| Styrene | 7.5 | — | — | — | 8 | — | — | — | — | — | — | — | — | — | — | — | 16.0 | |
| Paramethylstyrene | — | 8 | 8 | 8 | — | 8 | 8 | 8 | 8 | 12 | 16 | 16 | 8 | 16 | 16 | 12 | | |
| Solvent | 25 | 25 | 25 | 30 | 30 | 37 | 32 | 38 | 39 | 39 | 39.5 | 40 | 38 | 36 | 32 | 31 | 36.0 | 36.0 |
| Olefin concentrate | 38.5 | 38.5 | 36 | 29.7 | 29.7 | — | 24.1 | — | — | — | — | — | — | — | 20.3 | 22 | | |
| Sc C$_5$ olefins | | | | | | 20.9 | | | | | | | | | | | | |
| Total paraffins | | | | | | | | 16.7 | 13.2 | 12.2 | 11.1 | 8.6 | 16.7 | 17.7 | — | | 17.7 | 17.7 |
| alpha-methyl styrene | | | 43 | 43 | 43 | 43 | 43 | 43 | 43 | 43 | 43 | 43 | 43 | | | | | 16.0 |
| Resin Properties | | | | | | | | | | | | | | | | | | |
| Styrene content | 15.5 | | | | 18.5 | | | | | | | | | | | | | |
| Paramethylstyrene content | | 34.8 | 18.8 | 17.6 | 38.1 | 16.9 | 15.2 | 17.9 | 42.9 | 25.4 | 44.7 | 30.8 | 22.6 | 35.6 | 34 | | | |
| Resin yield | 36.7 | | 37.3 | 38 | | 39.6 | 39.6 | 41.7 | 2 | 43.3 | 3.6 | 45.9 | 41.2 | 40.4 | 40.9 | 41.8 | 41.3 | 40.2 |
| Pill yield | 2.8 | 5.9 | 5.5 | 5 | 3.7 | 4.4 | 4.4 | 4.3 | 99 | 4.9 | 97 | 4.2 | 4.5 | 7.6 | 7.3 | 4.7 | 6.3 | 7.1 |
| Softening point | 80.5 | 87.5 | 93 | 90 | 83.5 | 97 | 94 | 99 | 106 | 100 | 3 | 100 | 95 | 97 | 95 | 90.5 | 82 | 86 |
| Gardner colour | 4.5 | 4 | 3 | 3 | 3 | 3 | 3 | 3 | | 3 | 87 | 3 | 3 | 3 | 3 | 3 | 3 | 3 |
| Wax cloud point | 98 | 83 | 85 | 88 | 89 | 87 | 86 | 87 | | 87 | | 88 | 86 | 86 | 85 | 85 | | 3.5 |
| Heat stability (+0.2 wt % ethyl) | | | | | | | | | | | | | | | | | | |
| 150°C, 3 hrs | 7— | | 6— | | | | | | | | | | | | | | | |
| 150°C, 16 hrs | 12+ | | 9.5 | | | | | | | | | | | | | | | |
| Mn | 680 | 1138 | | 1135 | 1030 | | | 1200 | | | | | 1245 | 990 | 1000 | | | |
| Mw | 2965 | 3758 | | 3770 | 3600 | | | 5185 | | | | | 5660 | 3230 | 3585 | | | |
| Mw/Mn | 4.35 | 3.3 | | 3.33 | 3.49 | | | 4.23 | | | | | 454 | 3.25 | 3.6 | | | |
| Adhesive Properties | | | | | | | | | | | | | | | | | | |
| Hot Melt Adhesive (book binding) | | | | | | | | | | | | | | | | | | |
| WCP°C. | | | | | | | | | | 102 | | 93 | | 64 | <65 | | | |
| Viscosity at 180° C. (cps) | | | | | | | | | | — | | 13700 | | 12250 | 12250 | | | |
| T-Peel (gr/cm) | | | | | | | | | | | | | | | | | | |
| on PE | | | 625 | | | | | | | 300 | | 365 | 50 | 590 | 580 | 580 | | |
| on Al | | | 875 | | | | | | | 890 | | 950 | 780 | 1045 | 1035 | 900 | | |
| cpu time (sec) | | | | 12 | | | | | | 5(H) | | 5(H) | | | | 4.5 | | |
| setting time (sec) | | | | 14 | | | | | | 12(H) | | 11(H) | | | 12 | 12.5 | | |
| Heat Stability at 180° C. | | | | 17 | | | | | | 14(H) | | 14(H) | | | 14 | 14.5 | | |
| Colour .initial | | | | | | | | | | | | | | | | | | |
| .2 hrs | | | 0 | 0 | | | | | | 0 | | 0 | | | 0 | 0 | | |
| .25 hrs | | | 100(S) | 0 | | | | | | 80(S) | | 30 | | | 100(7) | 25(7) | | |
| .50 hrs | | | 100(S) | 0 | | | | | | 50 | | 85 | | | 100(9) | 80(9) | | |
| Skimming (%) 2 hrs | | | | | | | | | | | | | | | | | | |
| 25 hrs | | | | | | | | | | | | | | | | | | |
| 50 hrs | | | | | | | | | | | | | | | | | | |
| Mechanical Properties | | | | | | | | | | | | | | | | | | |
| Elongation (%) | | | | | | | | | | | | | | | 680 | 765 | | |
| Tensile strength (gr/mm$^2$) | | | | | | | | | | | | | | | 520 | 510 | | |
| 100 PSA (TR 1107) | | | | | | | | | | | | | | | | | | |
| 180 peel strength (gr/cm) | | | 1050 | | 600 | | 820 | | | 815 | | 900 | | | 910 | 830 | | |
| Loop tack (N/inch) | | | 28 | 17 | 17 | | 13 | | | 26 | | 28 | | | 24 | 28 | | |
| Ball Tack (cm) | | | 1.5 | 2 | 2 | | 2 | | | 6 | | 4 | | | 2.5 | 2 | | |
| Polyken (gr) | | | 1350 | | | | | | | 670 | | 1095 | | | 920 | 975 | | |
| Hot Shear (C, min) | | | 60°/20' | | 60°/20' | | 60°/20' | | | 60°/12' | | 60°/7' | | | 60/10 | 60/16 | | |
| Shear (Hrs) | | | 70 | | | | | | | | | | | | | | | |
| Viscosity at 175° C. (cpm) | | | 47000 | | | | | | | 50750 | | 52500 | | | | | | |

We claim:

1. A process for the production of petroleum tackifier resins comprising copolymerising using a Friedel Crafts catalyst a mixture consisting essentially of:
   (i) 70 to 95 wt.% of a $C_5$ olefins and/or diolefins and/or $C_6$ olefins and/or diolefins or a mixture of $C_5$ and $C_6$ olefins and/or diolefins feed and
   (ii) from 5 to 30 wt.% of para-methyl styrene; and forming a tackifier resin having a softening point of about 75° to 115° C. and a molecular weight Mn by GPC of about 500 to 1,500.

2. A tackifier resin comprising a copolymer containing from 5 to 60 wt.% of units derived from para methyl styrene and from 40 wt.% to 95 wt.% of units derived from $C_5$ olefins and/or diolefins and/or $C_6$ olefins and/or diolefins or a mixture of $C_5$ and $C_6$ olefines and/or diolefins, wherein said tackifier resin has a softening point of 75° to 115° C. and a molecular weight Mn by GPC of about 500 to 1,500.

3. An adhesive formulation containing as a tackifier resin a copolymer containing from 5 wt.% to 60 wt.% of units derived from para methyl styrene and from 40 wt.% to 95 wt.% of units derived from $C_5$ olefins and/or diolefins and/or $C_6$ olefins and/or diolefins or a mixture of $C_5$ and $C_6$ olefins and/or diolefins said tackifier resin having a softening point of about 75° to 115° C. and a molecular weight Mn by GPC of about 500 to 1,500.

4. A hot melt adhesive comprising
   (i) an ethylene vinyl acetate copolymer
   (ii) wax and P1 (iii) a tackifier resin which is a copolymer containing from 5 wt.% to 60 wt.% of units derived from a para methyl styrene and from 40 wt.% to 95 wt.% of units derived from $C_5$ olefins and/or diolefins and/or $C_6$ olefins and/or diolefins or a mixture of $C_5$ and $C_6$ olefins and/or diolefins, wherein said tackifier resin has a softening point of about 75° to 115° C. and a molecular weight Mn by GPC of about 500 to 1,500.

5. The tackifier resin of claim 2 having a softening point of 90°–105° C.

* * * * *